US007903594B1

(12) United States Patent
Marmur et al.

(10) Patent No.: US 7,903,594 B1

(45) Date of Patent: Mar. 8, 2011

(54) MULTIFUNCTIONAL CELLULAR MODEM FOR AIRCRAFT COMPUTING DEVICES

(75) Inventors: Jason D. Marmur, Cedar Rapids, IA (US); Timothy Ivan MacDonald, Toddville, IA (US); Richard J. Biro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 875 days.

(21) Appl. No.: 11/879,896

(22) Filed: Jul. 19, 2007

(51) Int. Cl.
*G06F 15/16* (2006.01)

(52) U.S. Cl. ........................................ 370/310; 455/431

(58) Field of Classification Search ................. 455/12.1, 455/414.1, 422.1, 431; 370/310, 310.1
See application file for complete search history.

(56) References Cited

U.S. PATENT DOCUMENTS

| | | | | |
|---|---|---|---|---|
| 6,788,935 | B1 * | 9/2004 | McKenna et al. | 455/431 |
| 7,599,691 | B1 * | 10/2009 | Mitchell | 455/431 |

* cited by examiner

*Primary Examiner* — Sam Bhattacharya

(74) *Attorney, Agent, or Firm* — Matthew J. Evans; Daniel M. Barbieri

(57) ABSTRACT

The present invention is directed to a multifunctional cellular modem for an aircraft computing device (ACD). The ACD is connectible to a wireless handheld cellular communication device. The ACD may utilize the wireless handheld cellular communication device as a cellular modem to download a file. Alternatively, the wireless handheld cellular communication device may include a storage media and may download the file and store the file in the storage media. Then the ACD may download the file from the storage media of the wireless handheld cellular communication device. The ACD may be installed in the aircraft and may be operable to install the downloaded file in the aircraft. By utilizing the present invention, an ACD is operable to provide a file for an aircraft without requiring costly dedicated PCMCIA (Personal Computer Memory Card International Association) cellular cards and service contracts for every ACD.

20 Claims, 5 Drawing Sheets

MULTIFUNCTIONAL CELLULAR MODEM FOR AIRCRAFT COMPUTING DEVICES

FIELD OF THE INVENTION

The present invention relates generally to flight systems and more particularly to a multifunctional cellular modem for aircraft computing devices.

BACKGROUND OF THE INVENTION

Flight management systems (FMS) are computerized avionics components found on many aircraft to assist pilots in navigation, flight planning, and aircraft control functions. FMS utilize databases which typically are updated frequently. Updating aircraft with the new database is critical. Typically, manual distribution is utilized to update FMS databases. This means that every time the database is updated, thousands of floppy disks must be made, shipped all over the world, and physically installed in every aircraft.

Consequently, it would be desirable to provide a solution which addresses the above-referenced problems and limitations of the current solutions.

SUMMARY OF THE INVENTION

Accordingly, the present invention is directed to a multifunctional cellular modem for an aircraft computing device (ACD). The ACD is connectible to a wireless handheld cellular communication device to provide a cellular connection for the ACD. The wireless handheld cellular communication device may comprise any kind of wireless handheld cellular communication device including, but not limited to, a cellular phone, a personal digital assistant (PDA), and a portable personal digital computer with a cellular card. The wireless handheld cellular communication device may be connected to the ACD via any kind of connection including, but not limited to, a USB (universal serial bus) connection, a serial connection, a parallel connection, an IEEE (institute of electrical and electronics engineers) 1394 connection, an infrared connection, a Wi-Fi connection, and a Bluetooth connection.

The ACD may utilize the wireless handheld cellular communication device as a cellular modem to download a file. The file may be downloaded from the Internet. The file may comprise a FMS (flight management system) database or other important files, such as documents or charts. Alternatively, the wireless handheld cellular communication device may include a storage media and the wireless handheld cellular communication device may download and store the file in the storage media. The wireless handheld cellular communication device may download the file from the Internet. The storage media may comprise any kind of storage media including, but not limited to, random access memory (RAM), flash memory, a hard disk drive, and an optical storage drive. Then the ACD may download the file from the storage media of the wireless handheld cellular communication device. The ACD may be installed in the aircraft and may be operable to install the downloaded file in the aircraft or equipment of the aircraft, such as a FMS.

The present invention provides a system and method for providing a file for an aircraft when Wi-Fi coverage may not be available. By utilizing a wireless handheld cellular communication device as a cellular modem to download a file, or by downloading a file to the storage a media of wireless handheld cellular communication device and then to an ACD, an ACD is operable to provide a file for an aircraft without requiring costly dedicated PCMCIA (Personal Computer Memory Card International Association) cellular cards and service contracts for every ACD.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

An aircraft computing device (ACD) is any computing device on an aircraft which needs to obtain a file from a remote source. An example of an ACD includes, but is not limited to, Electronic Flight Bags (EFB). EFB are electronic management devices that help flight crews perform flight management tasks more easily and efficiently with less paper. Some EFB installed in aircraft include a wireless connection to the Internet. One the EFB is connected to the Internet the EFB can be utilized to download the new database (or other important files such as documents or charts) and installed into the aircraft equipment. However, EFB typically only include 802.11a/b/g Wi-Fi capabilities for the wireless connection. Unfortunately, Wi-Fi is not available at every location where the aircraft may be.

Figure 1:
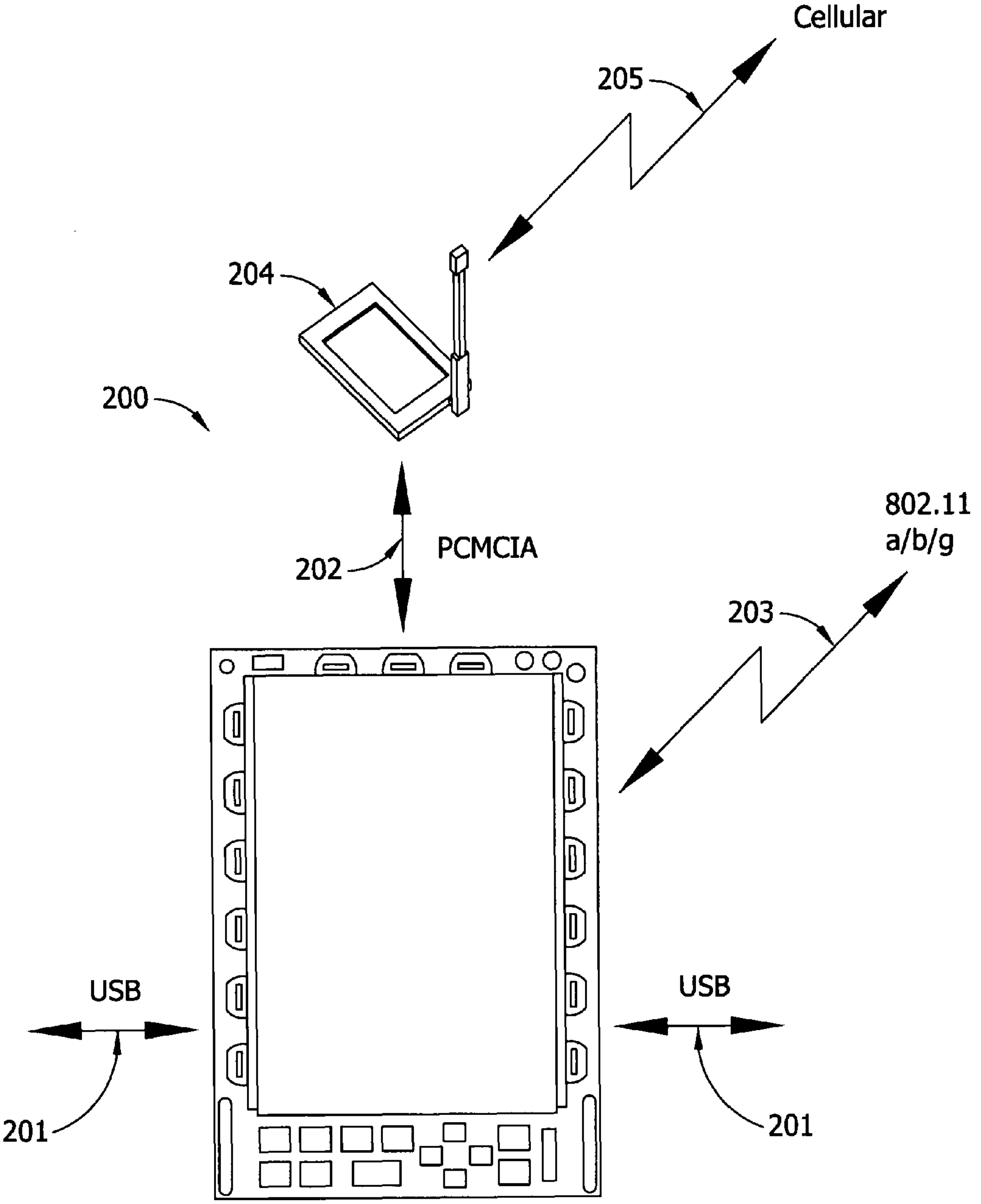
FIG. 1 is a diagram illustrating a system for providing a file for an Electronic Flight Bag (EFB)

As shown in FIG. 1, an electronic flight bag (EFB) 200 may include one or more PCMCIA (Personal Computer Memory Card International Association) slots 202 and a cellular connection 205 may be added to an EFB by installing a PCMCIA cellular card 204 in an available PCMCIA slot 202 in the EFB 200. Adding a cellular connection 205 to an EFB 200 would allow downloading of files to the EFB 200 when Wi-Fi is not available. The EFB 200 would be able to utilize the PCMCIA cellular card 204 as a cellular modem to connect to the Internet (or other location where a file as located) and download a file.

However, this solution would require the additional hardware cost of purchasing a PCMCIA cellular card 204 for every EFB 200. Also, cellular contracts would have to be obtained and monthly cellular fees would have to be paid specifically for each PCMCIA cellular card 204 utilized in every EFB 200.

Figure 2:
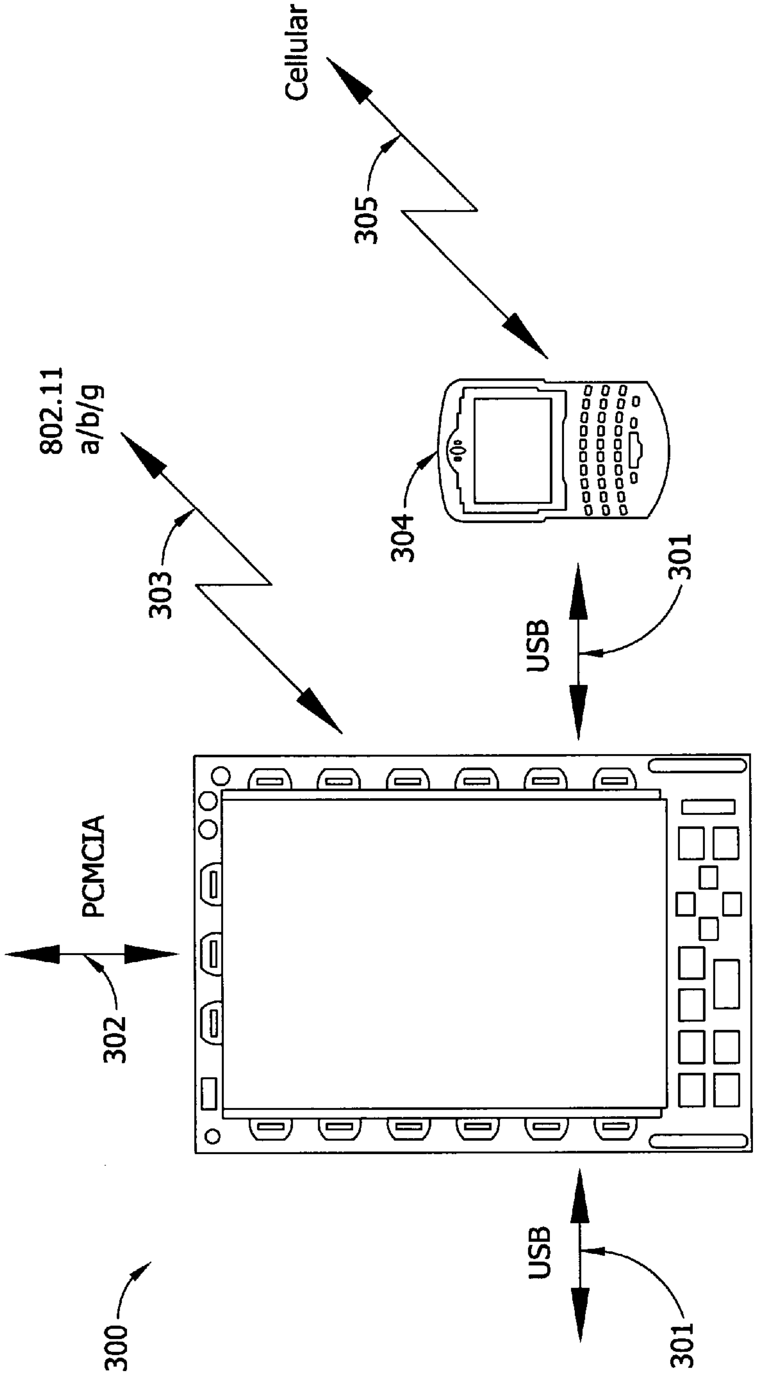
FIG. 2 is a diagram illustrating a system for providing a file for an EFB, in accordance with an exemplary embodiment of the present invention.

Referring now to FIG. 2; a system for providing a file for an EFB 300, in accordance with an exemplary embodiment of the present invention, is illustrated. The EFB 300 is connectible to a wireless handheld cellular communication device 304 to provide a cellular connection 305 for the EFB 300. The wireless handheld cellular communication device 304 may comprise any kind of wireless handheld cellular communication device including, but not limited to, a cellular phone, a personal digital assistant (PDA), and a portable personal digital computer with a cellular card. The EFB 300 is shown connected to the wireless handheld cellular communication device 304 via a USB (universal serial bus) connection 301. However, the wireless handheld cellular communication device 304 may be connected 301 to the EFB 300 via any kind of connection including, but not limited to, a serial connection, a parallel connection, an IEEE (institute of electrical and electronics engineers) 1394 connection, an infrared connection, a Wi-Fi connection, and a Bluetooth connection.

The EFB 300 may utilize the wireless handheld cellular communication device 304 as a cellular modem to download a file. The file may be downloaded from the Internet. The file may comprise a FMS (flight management system) database or other important files, such as documents or charts.

Alternatively, the wireless handheld cellular communication device 304 may include a storage media and the wireless handheld cellular communication device 304 may download the file and store the file in the storage media. The storage media may comprise any kind of storage media including, but not limited to, random access memory (RAM), flash memory, a hard disk drive, and an optical storage drive. The wireless handheld cellular communication device 304 may download the file from the Internet. Then the EFB 300 may download the file from the storage media of the wireless handheld cellular communication device 304. In this way, the wireless handheld cellular communication device 304 does not have to be connected to EFB 300 when the file is initially downloaded to the wireless handheld cellular communication device 304 and stored in the storage area. Rather, the wireless handheld cellular communication device 304 only needs to be connected to the EFB 300 when the file is downloaded to the EFB 300 from the storage area of the wireless handheld cellular communication device 304. For example, the wireless handheld cellular communication device 304 may download the file throughout the day, overnight, or when the wireless handheld cellular communication device 304 is in a cellular service area. After the file has been downloaded and stored in the storage media of the wireless handheld cellular communication device 304, the wireless handheld cellular communication device 304 is connected to the EFB 300 and the EFB 300 downloads the file from the storage area of the wireless handheld cellular communication device 304 to the EFB 300.

Figure 3:
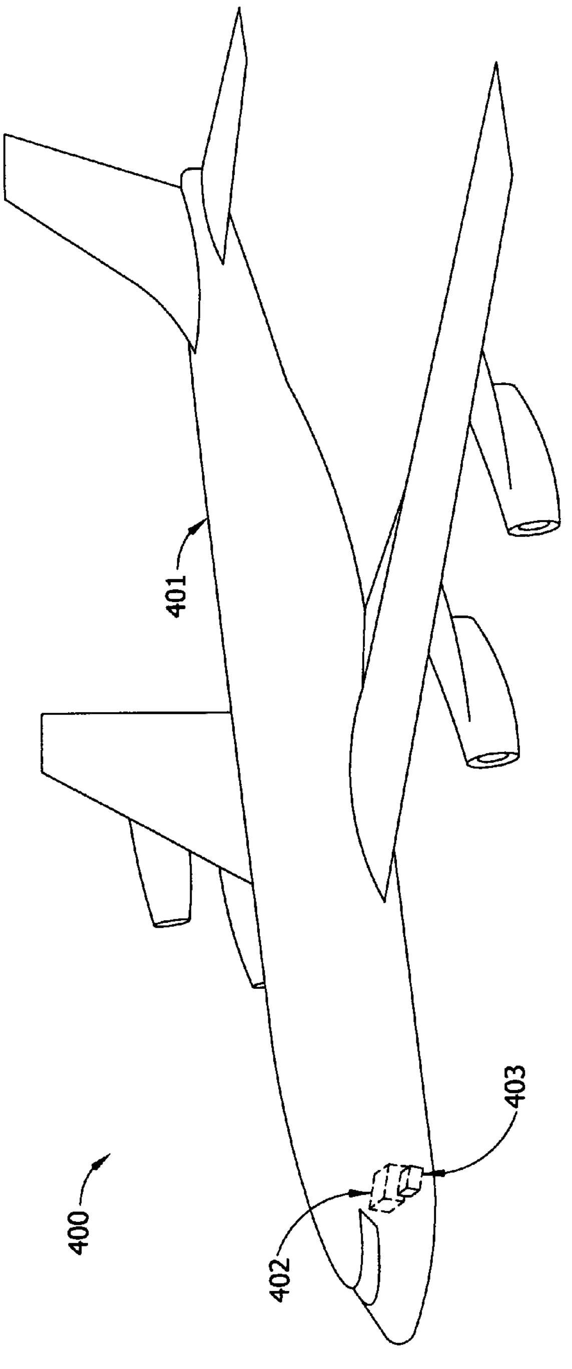
FIG. 3 is a diagram illustrating a system for providing a file for an aircraft, in accordance with an exemplary embodiment of the present invention.

Referring now to FIG. 3; a system 400 for providing a file for an aircraft 401, in accordance with an exemplary embodiment of the present invention, is illustrated. The system 400 includes an aircraft 401, an EFB 402 and a wireless handheld cellular communication device 403. The EFB 402 may be installed in the aircraft 401. The EFB 402 is operable to utilize the wireless handheld cellular communication device 403 to download a file for the aircraft. The file may be downloaded from the Internet. The file may be downloaded from a storage media included in the wireless handheld cellular communication device 403. The EFB 402 may operable to install the downloaded file in the aircraft 401 or equipment of the aircraft 401, such as a FMS.

Figure 4:
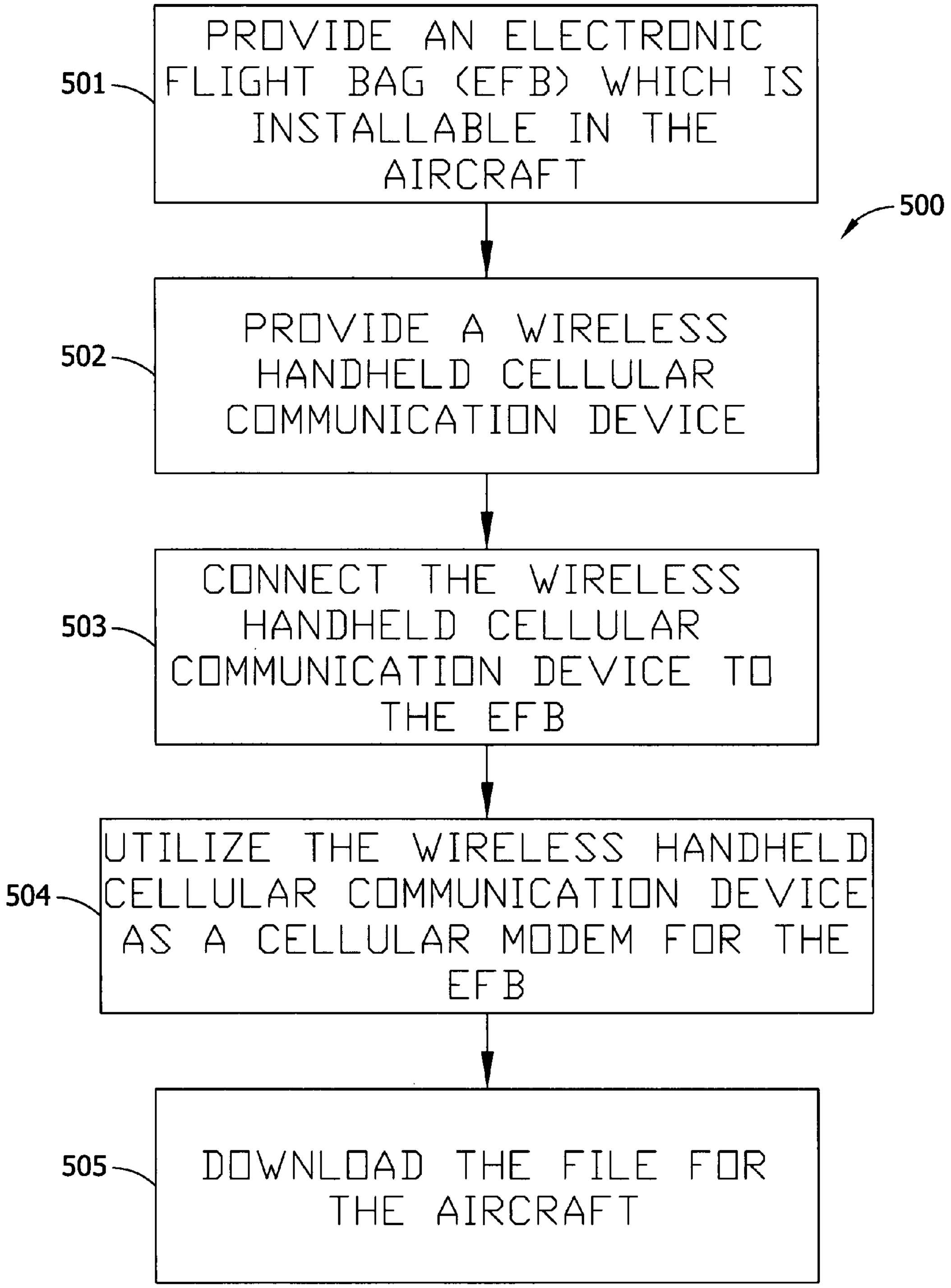
FIG. 4 is a flowchart illustrating a method of providing a file for an aircraft, in accordance with an exemplary embodiment of the present invention.

Referring now to FIG. 4, a method 500 of providing a file for an aircraft, in accordance with an exemplary embodiment of the present invention, is shown. In step 501, an EFB is provided, which is installable in an aircraft. In step 502, a wireless handheld cellular communication device is provided. The wireless handheld cellular communication device may comprise any wireless handheld cellular communication device including, but not limited to, a cellular phone, a PDA, and a portable personal digital computer with a cellular card. In step 503, the wireless handheld cellular communication device is connected to the EFB. The wireless handheld cellular communication device may be connected to the EFB via any kind of connection including, but not limited to, a USB connection, a serial connection, a parallel connection, an IEEE 1394 connection, an infrared connection, a Wi-Fi connection, and a Bluetooth connection. In step 504, the wireless handheld cellular communication device is utilized as a cellular modem for the EFB. In step 505, a file is downloaded for the aircraft. The file may be downloaded from the Internet.

Figure 5:
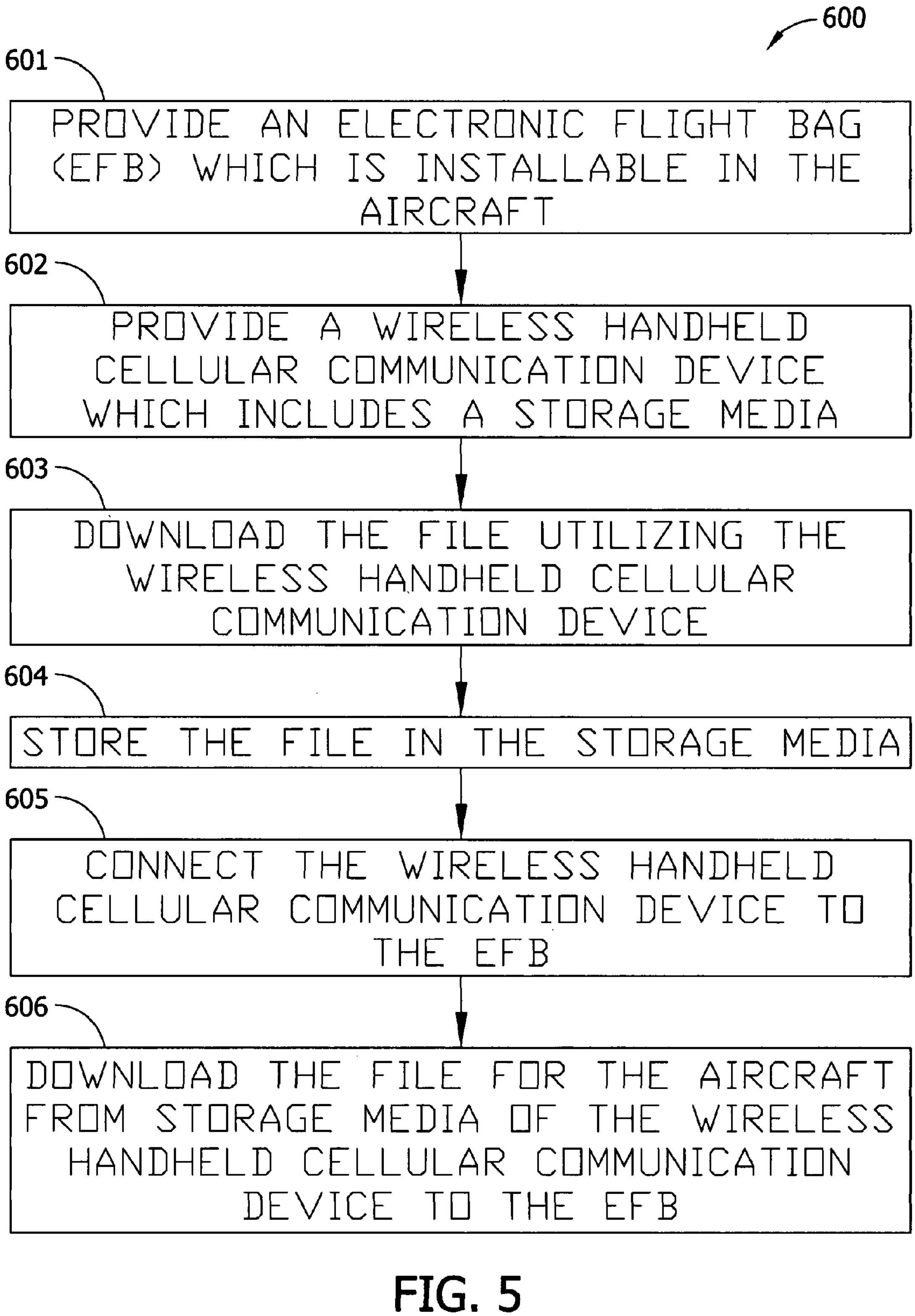
FIG. 5 is a flowchart illustrating a method of providing a file for an aircraft, in accordance with an alternative embodiment of the present invention.

Referring now to FIG. 5, a method 600 of providing a file for an aircraft, in accordance with an exemplary embodiment of the present invention, is shown. In step 601, an EFB is provided, which is installable in an aircraft. In step 602, a wireless handheld cellular communication device is provided, which includes a storage media. The storage media may comprise any kind of storage media including, but not limited to, random access memory (RAM), flash memory, a hard disk drive, and an optical storage drive. The wireless handheld cellular communication device may comprise any wireless handheld cellular communication device including, but not limited to, a cellular phone, a PDA, and a portable personal digital computer with a cellular card. In step 603, the file is downloaded utilizing the wireless handheld cellular communication device. In step 604, the file is stored in the storage media of the wireless handheld cellular communication device. In step 605, the wireless handheld cellular communication device is connected to the EFB. The wireless handheld cellular communication device may be connected to the EFB via any kind of connection including, but not limited to, a USB connection, a serial connection, a parallel connection, an IEEE 1394 connection, an infrared connection, a Wi-Fi connection, and a Bluetooth connection. In step 606, the file for is downloaded for the aircraft from the storage media of the wireless handheld cellular communication to device to the EFB. The file may be downloaded from the Internet.

The present invention provides a system and method for providing a file for an aircraft when Wi-Fi coverage may not be available. By utilizing a wireless handheld cellular communication device as a cellular modem to download a file, or by downloading a file to the storage media of a wireless handheld cellular communication device and then to an ACD, an ACD is operable to provide a file for an aircraft without requiring costly dedicated PCMCIA cellular cards and service contracts for every ACD.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for providing a file for an aircraft, comprising:

an aircraft computing device (ACD), which is installable in the aircraft; and a wireless handheld cellular communication device, which is connectible to the ACD;

wherein the ACD is operable to utilize the wireless handheld cellular communication device as a cellular modem to download the file for the aircraft.

2. The system as claimed in claim 1, wherein the file comprises a flight management system (FMS) database.

3. The system as claimed in claim 1, wherein the wireless handheld cellular communication device comprises one selected from a cellular phone and a personal digital assistant (PDA) and wherein the wireless handheld cellular communication device is connectible to the ACD via one selected from a USB (universal serial bus) connection, a serial connection, a parallel connection, an IEEE (institute of electrical and electronics engineers) 1394 connection, an infrared connection, a Wi-Fi connection, and a bluetooth connection.

4. The system as claimed in claim 1, wherein the ACD is operable to install the file in the aircraft.

5. The system as claimed in claim 1, wherein the ACD downloads the file from the Internet.

6. A method of providing a file for an aircraft, comprising the steps of:

providing an aircraft computing device (ACD), which is installable in the aircraft;

providing a wireless handheld cellular communication device;

connecting the wireless handheld cellular communication device to the ACD;

utilizing the wireless handheld cellular communication device as a cellular modem for the ACD; and downloading the file for the aircraft.

7. The method of claim 6, wherein the file comprises a flight management system (FMS) database.

8. The method of claim 6, wherein the wireless handheld cellular communication device comprises one selected from a cellular phone and a personal digital assistant (PDA) and wherein the wireless handheld cellular communication device is connectible to the ACD via one selected from a USB (universal serial bus) connection, a serial connection, a parallel connection, an IEEE (institute of electrical and electronics engineers) 1394 connection, an infrared connection, a Wi-Fi connection, and a bluetooth connection.

9. The method of claim 6, wherein the ACD is operable to install the file in the aircraft.

10. The method of claim 6, wherein the ACD downloads the file from the Internet.

11. A system for providing a file for an aircraft, comprising:

an aircraft computing device (ACD), which is installable in the aircraft; and a wireless handheld cellular communication device, which includes a storage media and is connectible to the ACD;

wherein the wireless handheld cellular communication device is operable to download the file, the wireless handheld cellular communication device is operable to store the file in the storage media, and the ACD is operable to download the file for the aircraft from the storage media of the wireless handheld cellular communication device.

12. The system of claim 11, wherein the file comprises a flight management system (FMS) database.

13. The system as claimed in claim 11, wherein the wireless handheld cellular communication device comprises one selected from a cellular phone and a personal digital assistant (PDA) and wherein the wireless handheld cellular communication device is connectible to the ACD via one selected from a USB (universal serial bus) connection, a serial connection, a parallel connection, an IEEE (institute of electrical and electronics engineers) 1394 connection, an infrared connection, a Wi-Fi connection, and a bluetooth connection.

14. The system as claimed in claim 11, wherein the ACD is operable to install the file in the aircraft.

15. The system as claimed in claim 11, wherein the wireless handheld cellular communication device downloads the file from the Internet.

16. A method of providing a file for an aircraft, comprising the steps of:

providing an aircraft computing device (ACD), which is installable in the aircraft;

providing a wireless handheld cellular communication device, which includes a storage media;

downloading the file utilizing the wireless handheld cellular communication device;

storing the file in the storage media;

connecting the wireless handheld cellular communication device to the ACD; and downloading the file for the aircraft from storage media of the wireless handheld cellular communication device to the ACD.

17. The method of claim 16, wherein the file comprises a flight management system (FMS) database.

18. The method of claim 16, wherein the wireless handheld communication device comprises one selected from a cellular phone and a personal digital assistant (PDA) and wherein the wireless handheld cellular communication device is connectible to the ACD via one selected from a USB (universal serial bus) connection, a serial connection, a parallel connection, an IEEE (institute of electrical and electronics engineers) 1394 connection, an infrared connection, a Wi-Fi connection, and a bluetooth connection.

19. The method of claim 16, wherein the ACD is operable to install the file in the aircraft.

20. The method of claim 16, wherein the ACD is operable to install the file in the aircraft.

* * * * *